US008130206B2

(12) United States Patent
Lindroos

(10) Patent No.: US 8,130,206 B2
(45) Date of Patent: Mar. 6, 2012

(54) APPARATUS, METHOD, COMPUTER PROGRAM AND USER INTERFACE FOR ENABLING A TOUCH SENSITIVE DISPLAY

(75) Inventor: Sanna Lindroos, Tampere (FI)

(73) Assignee: Nokia Corporation, Espoo (FI)

( * ) Notice: Subject to any disclaimer, the term of this patent is extended or adjusted under 35 U.S.C. 154(b) by 1026 days.

(21) Appl. No.: 11/973,771

(22) Filed: Oct. 9, 2007

(65) Prior Publication Data

US 2009/0091544 A1  Apr. 9, 2009

(51) Int. Cl.
*G06F 3/041* (2006.01)
(52) U.S. Cl. .................. 345/173; 715/863; 715/864
(58) Field of Classification Search .......... 345/156–157, 345/168–169, 173–178; 715/863–864; 708/142–146; 341/22–28
See application file for complete search history.

(56) References Cited

U.S. PATENT DOCUMENTS

| 5,424,966 | A  | * | 6/1995  | Hirayama | 708/146    |
|-----------|----|---|---------|----------|------------|
| 6,396,523 | B1 | * | 5/2002  | Segal et al. | 715/863 |
| 7,004,394 | B2 | * | 2/2006  | Kim      | 235/472.01 |
| 7,479,949 | B2 | * | 1/2009  | Jobs et al. | 345/173 |
| 7,480,870 | B2 | * | 1/2009  | Anzures et al. | 715/772 |
| 7,593,000 | B1 | * | 9/2009  | Chin     | 345/156    |
| 7,602,378 | B2 | * | 10/2009 | Kocienda et al. | 345/169 |
| 7,657,849 | B2 | * | 2/2010  | Chaudhri et al. | 715/863 |
| 7,843,427 | B2 | * | 11/2010 | Ording et al. | 345/157 |
| 2005/0116840 | A1 | * | 6/2005  | Simelius | 341/22   |
| 2007/0200734 | A1 | * | 8/2007  | Lee et al. | 341/22  |
| 2007/0236468 | A1 | * | 10/2007 | Tuli     | 345/173    |
| 2007/0300140 | A1 | * | 12/2007 | Makela et al. | 714/799 |
| 2009/0128516 | A1 | * | 5/2009  | Rimon et al. | 345/174 |

* cited by examiner

*Primary Examiner* — Jason Mandeville
(74) *Attorney, Agent, or Firm* — Harrington & Smith

(57) ABSTRACT

An apparatus including a touch sensitive display including a first portion and a second portion; and a processor configured to detect user inputs on the touch sensitive display and control the touch sensitive display, wherein; the processor is configured to control the touch sensitive display, to enable a first state, in which the first portion of the touch sensitive display is operable to enable access to a first set of functions and the second portion of the touch sensitive display is operable to enable access to a second set of functions, and to enable, in response to the detection of a first user input when the touch sensitive display is in the first state, a second state in which the second portion of the touch sensitive display is not operable to enable access to any one of the second set of functions and the first portion is operable to enable access to a set of functions.

19 Claims, 6 Drawing Sheets

APPARATUS, METHOD, COMPUTER PROGRAM AND USER INTERFACE FOR ENABLING A TOUCH SENSITIVE DISPLAY

FIELD OF THE INVENTION

Embodiments of the present invention relate to an apparatus, method, computer program and user interface for enabling a touch sensitive display. In particular, they relate to an apparatus, method, computer program and user interface for enabling a touch sensitive display which enables access to a plurality of functions.

BACKGROUND TO THE INVENTION

Electronic apparatus having a plurality of functions are well known. For example common functions of an electronic apparatus include communications functions which enable the apparatus to operate as a mobile cellular telephone or in a low power radio frequency network, a camera function which enables the apparatus to capture and store images and personal music player functions which enables the apparatus to store and play back audio files etc.

Often a user may wish to access some functions of the apparatus but prevent access to other functions, either via accidental actuation by a user input or via actuation by an unauthorized user.

BRIEF DESCRIPTION OF THE INVENTION

According to one embodiment of the invention there is provided an apparatus comprising: a touch sensitive display comprising a first portion and a second portion; and a processor configured to detect user inputs on the touch sensitive display and control the touch sensitive display, wherein; the processor is configured to control the touch sensitive display, to enable a first state, in which the first portion of the touch sensitive display is operable to enable access to a first set of functions and the second portion of the touch sensitive display is operable to enable access to a second set of functions, and to enable, in response to the detection of a first user input when the touch sensitive display is in the first state, a second state in which the second portion of the touch sensitive display is not operable to enable access to any one of the second set of functions and the first portion is operable to enable access to a set of functions.

This provides the advantage that the apparatus can be easily configured in a state in which the second set of functions are not accessible. This may be particularly beneficial where a user wishes to use the first set of functions but wishes to avoid accidentally actuating the second portion of the touch sensitive display and accessing the second set of functions. For example, a user of the apparatus may wish to access the music playing functions of the apparatus so that they can listen to an audio file while the apparatus is carried in a bag or pocket without accidentally accessing any other functions.

The invention may also be beneficial where a user of the apparatus wishes to allow a second user to use the apparatus but wishes to prevent them from accessing the second set of functions because, for example, the second set of functions may enable access to confidential information.

In some embodiments of the invention when the touch sensitive display is in the second state the processor is configured to control, in response to a second user input, the touch sensitive display to enter a state in which the second portion of the touch sensitive display is operable to enable access to a set of functions.

This provides the advantage that the apparatus can be easily configured in a state in which the second set of functions are accessible again.

According to another embodiment of the invention there is provided a method comprising: enabling a touch sensitive display in a first state in which a first portion of the touch sensitive display is operable to enable access to a first set of functions and a second portion of the touch sensitive display is operable to enable access to a second set of functions; detecting a first user input; enabling the touch sensitive display, in response to the detection of the first user input, in a second state in which the second portion of the touch sensitive display is not operable to enable access to any one of the second set of functions and the first portion is operable to enable access to a set of functions.

According to another embodiment of the invention there is provided a computer program comprising program instructions for controlling an apparatus, the apparatus comprising, a touch sensitive display comprising a first portion and a second portion the program instructions providing, when loaded into a processor: means for enabling a touch sensitive display in a first state in which the first portion of the touch sensitive display is operable to enable access to a first set of functions and the second portion of the touch sensitive display is operable to enable access to a second set of functions; means for detecting a first user input; means for enabling the touch sensitive display, in response to the detection of the first user input, in a second state in which the second portion of the touch sensitive display is not operable to enable access to any one of the second set of functions and the first portion is operable to enable access to a set of functions.

According to another embodiment of the invention there is provided a user interface comprising: a touch sensitive display comprising a first portion and a second portion the touch sensitive display having a first state, in which the first portion of the touch sensitive display is operable to enable access to a first set of functions and the second portion of the touch sensitive display is operable to enable access to a second set of functions, and a second state in which the second portion of the touch sensitive display is not operable to enable access to any one of the second set of functions and the first portion is operable to enable access to a set of functions; wherein when the touch sensitive display is in the first state the touch sensitive display is operable to receive a first user input such that in response to the detection of the first user input the touch sensitive display enters the second state.

The apparatus may be for wireless communication.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 1:
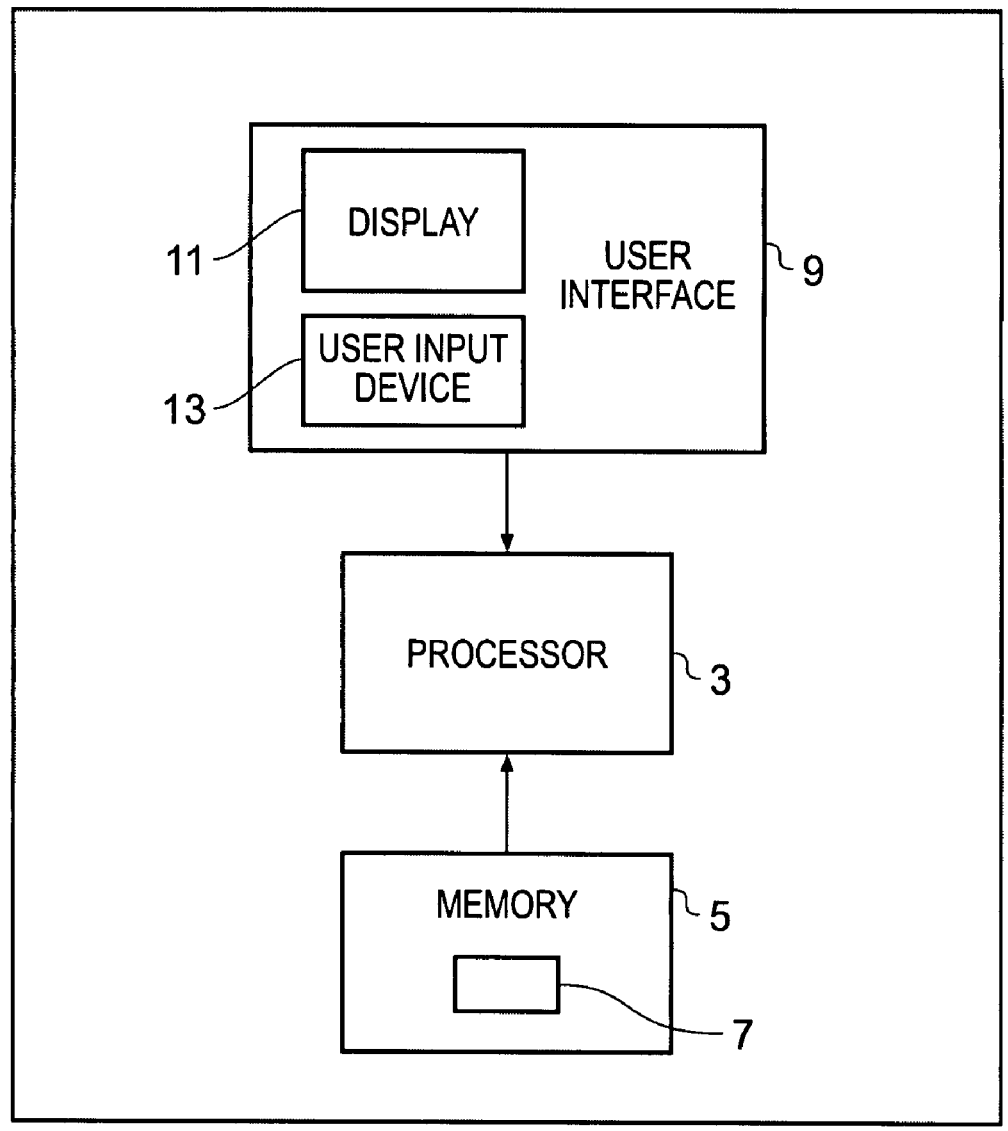
FIG. 1 schematically illustrates an electronic apparatus.
Figure 1:
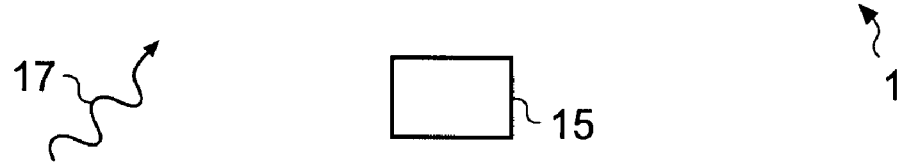

The Figures illustrate an apparatus 1 comprising: a touch sensitive display 11 comprising a first portion 31 and a second portion 33; and a processor 3 configured to detect user inputs on the touch sensitive display 11 and control the touch sensitive display 11, wherein; the processor 3 is configured to control the touch sensitive display 11, to enable a first state, in which the first portion 31 of the touch sensitive display 11 is operable to enable access to a first set of functions and the second portion 33 of the touch sensitive display 11 is operable to enable access to a second set of functions, and to enable, in response to the detection of a first user input when the touch sensitive display 11 is in the first state, a second state in which the second portion 33 of the touch sensitive display 11 is not operable to enable access to any one of the second set of functions and the first portion 31 is operable to enable access to a set of functions.

FIG. 1 schematically illustrates an electronic apparatus 1. Only the features referred to in the following description are illustrated. It should, however, be understood that the apparatus 1 may comprise additional features that are not illustrated. The electronic apparatus 1 may be, for example, a mobile cellular telephone, a personal computer, a personal digital assistant, a personal music player or any other electronic apparatus that comprises a touch sensitive display. The electronic apparatus 1 may be a handheld apparatus which can be carried in a user's hand, handbag or jacket pocket, for example.

The illustrated electronic apparatus 1 comprises: a user interface 9, a memory 5, and a processor 3. The processor 3 is connected to receive input commands from the user interface 9 and to provide output commands to the user interface 9. The processor 3 is also connected to write to and read from the memory 5.

The user interface 9 comprises a touch sensitive display 11. The touch sensitive display 11 presents a graphical user interface to a user. Examples of graphical user interfaces according to some embodiments of the invention are illustrated in FIGS. 3A to 3C, FIGS. 5A to 5C and FIGS. 6A to 6C.

The touch sensitive display 11 is configured to enable a user to input information into the apparatus 1 and to access the functions of the apparatus 1. The apparatus 1 may also comprise a further user input device 13 such as any one or more of a key, a key pad, a joystick or a roller.

The touch sensitive display 11 is also configured to display information to a user. The information may be, for example, information which has been input by a user via a user input device such as the touch sensitive display 11 or the further user input device 13 or information which is stored in the memory 5.

The memory 5 stores computer program instructions 7, which when loaded into the processor 3, enable the processor 3 to control the operation of the apparatus 1 as described below. The computer program instructions 7 provide the logic and routines that enables the electronic apparatus 1 to perform the methods illustrated in FIGS. 2 and 4.

The computer program instructions 7 may arrive at the electronic device 1 via an electromagnetic carrier signal 17 or be copied from a physical entity 15 such as a computer program product, a memory device or a record medium such as a CD-ROM or DVD.

Figure 2:
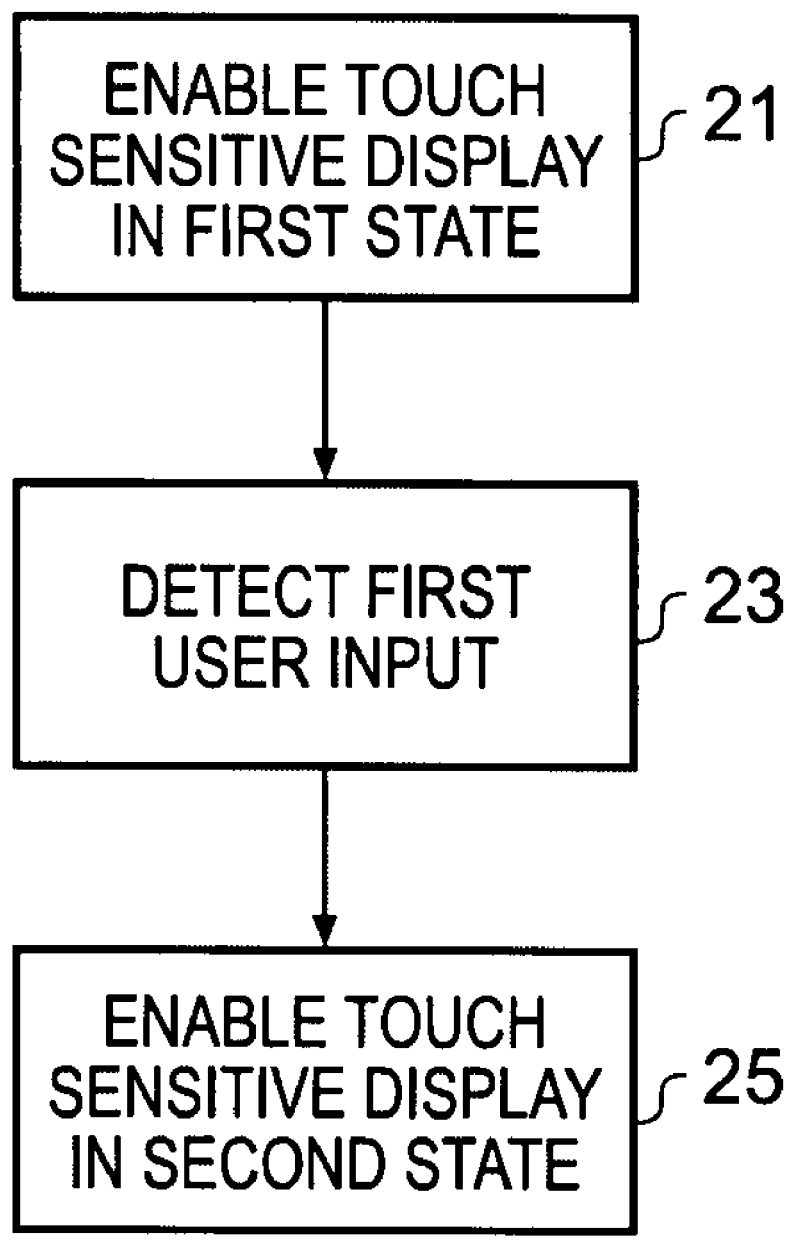
FIG. 2 illustrates a flow chart showing method blocks of an embodiment of the present invention.

A method of controlling the apparatus 1, according to the present invention, is illustrated schematically in FIG. 2.

At block 21 the touch sensitive display 11 is enabled in a first state. In the first state a first portion 31 of the touch sensitive display 11 is operable to enable access to a first set of functions and a second portion 33 of the touch sensitive display 11 is operable to enable access to a second set of functions.

The portions 31, 33 of the touch sensitive display 11 may enable access to the respective functions by having specific regions associated with particular functions such that actuating a specific region provides a shortcut to the associated function. The processor 3 may control the touch sensitive display 11 to display icons in the specific regions indicative of the associated functions.

The portions 31, 33 of the touch sensitive display 11 may also enable access to a function or set of functions by enabling access to a menu and enabling a user to navigate through the menu, using the touch sensitive display 11 and then select the function or functions.

The portions 31, 33 of the touch sensitive display may or may not be demarcated on the display. That is, the portions 31, 33 may be physically distinct portions or logically distinct portions. The portions 31, 33 may exist temporarily or permanently. The portions 31, 33 may have a fixed size or a size controlled by the processor.

A set of functions includes one or more functions. The first set of functions and the second set of functions may be distinct so that none of the functions of the first set are also functions of the second set. Alternatively the first set of functions may comprise functions of the second set and vice versa. For example both the first and second set of functions may include the function of enabling access to a menu.

At block 23 the processor 3 detects a first user input.

The first user input may comprise a trace 35 from a first position 37 on the touch sensitive display 11 to a second position 39 on the touch sensitive display 11. The trace 35 may be made by the user dragging their finger or a stylus across the surface of the touch sensitive display 11. Some touch sensitive displays require contact between the finger or stylus and the surface of the display whereas others merely require the finger or stylus to be brought close to the surface of the display.

In other embodiments the first user input may comprise a user touching a specific region of the touch sensitive display or making a gesture other than a trace on the touch sensitive display.

In response to the detection of the first user input the processor 3 enables, at block 25, the touch sensitive display 11 in a second state. In the second state the second portion 33 is not operable to enable access to any one of the second set of functions but the first portion 31 is operable to enable access to a set of functions.

In some embodiments the second portion 33 may be completely inoperable when the touch sensitive display 11 is in the second state so that a user input on the second portion 33 has no effect.

In other embodiments the second portion 33 may be operable to receive limited user inputs when the touch sensitive display 11 is in the second state. For example a user may be able to use the second portion 33 when making an unlock input which would cause the second portion 33 to become operable to enable access to the second set of functions again. An unlock input may be a fingerprint input, the actuation of specific keys in a specific sequence, a pin number or a trace user input in the reverse direction to the trace of the first user input. A user may also be able to temporarily unlock the second portion 33 of the touch sensitive display 11 by dialing an emergency number such as 911.

In response to any other attempted user input the processor 3 may be configured to enable the touch sensitive display 11 to present a message indicating that the portion 33 of the touch pad is locked.

When the touch sensitive display 11 is enabled in the second state the first portion 31 remains operable to enable access to a set of functions. The set of functions may be the first set of functions. In some embodiments the set of functions may be different to the first set of functions. For example, the set of functions may comprise some or all of the first set of functions as well as some additional functions.

Figure 3A:
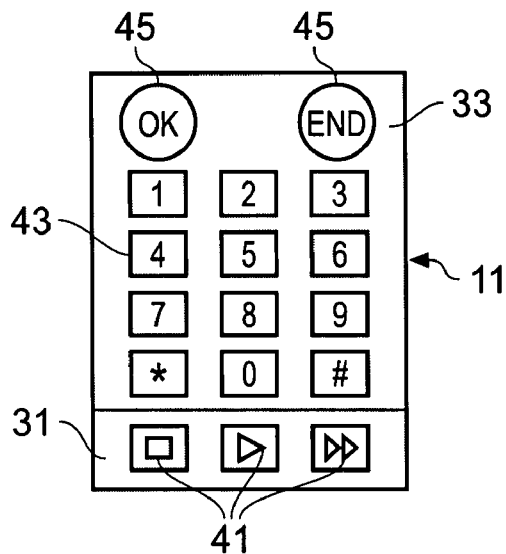
FIGS. 3A to 3C illustrate an embodiment of the present invention in use.
Figure 3B:
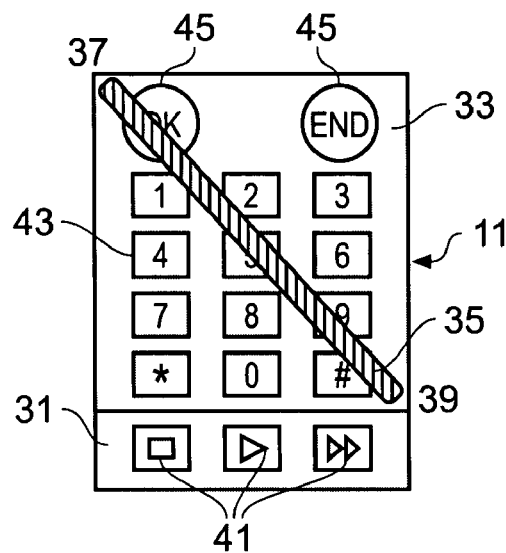

FIGS. 3A to 3B illustrate a graphical user interface according to an embodiment of the present invention.

In FIG. 3A the touch sensitive display 11 is enabled 21 in the first state. In the illustrated embodiment the first portion 31 of the touch sensitive display 11 comprises user inputs 41 which may be used to enable access to music playing functions such as selecting and playing audio files and the second portion 33 of the touch sensitive display 11 comprises a keypad 43 such as an ITU-T keypad which enables access to communications functions. The second portion 33 also comprises user inputs 45 which may be used to select and cancel functions. The keypad 43 and user inputs 45 may enable a user of the apparatus 1 to input telephone numbers, and to make and receive telephone calls or to input SMS messages.

In the particular graphical user interface illustrated in FIG. 3A the touch sensitive display 11 is divided into two portions 31, 33 and each portion is associated with a different set of functions. In other embodiments the touch sensitive display 11 may be divided into more than two portions and each portion may be associated with one particular function or with a plurality of functions.

In the graphical user interface illustrated in FIG. 3B a user has made an input comprising a trace 35. The trace 35 extends diagonally across the second portion 33 of the touch sensitive display 11, from a first position 37 in the top left hand corner of the second portion 33 to a second position 39 in the bottom right hand corner of the second portion 33.

In some embodiments the touch sensitive display 11 may display icons which indicate where the trace 35 should begin and end. In the illustrated embodiment the trace 35 extends substantially across the entire diagonal of the portion 33 which the user wishes to lock. In other embodiments the trace 35 may only extend across part of the diagonal of the portion 33 which the user wishes to lock.

Figure 3C:
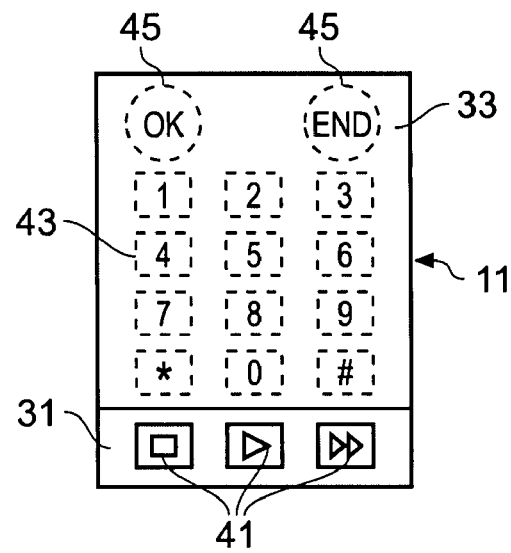

FIG. 3C illustrates the graphical user interface which is presented to a user in response to the detection 23 of the user input trace 35. The touch sensitive display 11 is now enabled 25 in a second state in which the second portion 33 is locked but the first portion 31 remains configured to enable access to a set of functions. When the second portion 33 is locked it is not operable to access any of the communications functions which were accessible in the first state.

In the particular embodiment illustrated in FIG. 3C the apparatus 1 is configured so that the functions of the music player are accessible in the second state but the communications functions are not. This prevents accidental actuation of the communications functions but still enables a user to use the music player functions.

In the illustrated embodiment the keypad 43 and the user inputs 45 of the second portion 33 are presented with dashed lines in the second state to indicate that the second portion 33 is locked. The user inputs 41 of the first portion 31 are presented in the same way as in the first state because the first portion 31 is not locked and the functions of the music player are still accessible using the first portion 31.

In other embodiments the second portion 33 of touch sensitive display 11 may have dimmed backlighting in the second state to indicate that it is locked. In other embodiments the processor 3 may configure the touch sensitive display 11 to present an image such as a message or icon indicating that the second portion 33 of the touch sensitive display 11 is locked.

Figure 4:
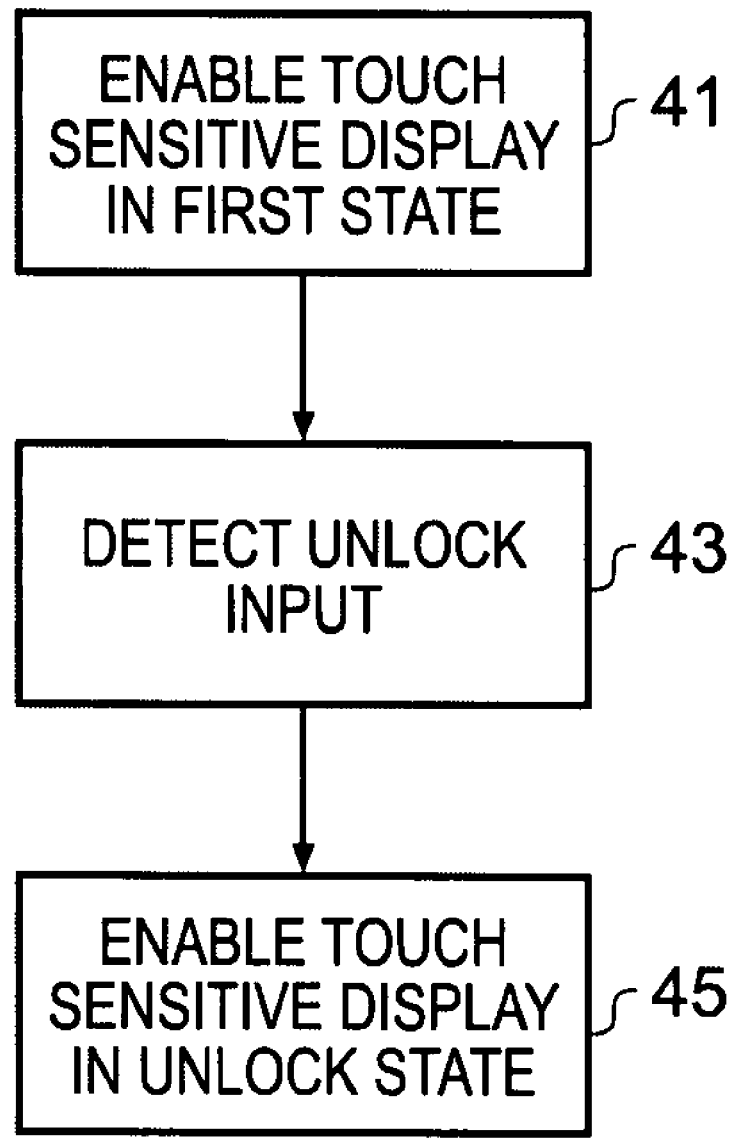
FIG. 4 illustrates a second flow chart showing method blocks of an embodiment of the present invention.

A method of controlling the touch sensitive display 11 to exit the second state is illustrated schematically in FIG. 4.

At block 51 the processor 3 enables the touch sensitive display 11 in the second state in which, as described above, the second portion 33 is not operable to enable access to the second set of functions.

At block 53 the processor 3 detects an unlock input. The unlock input may be for example, a user input trace 61 extending from a second position 39 on the touch sensitive display 11 to a first position 37 on the touch sensitive display 11 in a reverse gesture of the first user input trace 35. In other embodiments the unlock input may be a fingerprint input, that is, the recognition of the print of a finger or thumb of a users hand. In other embodiments the unlock input may be the actuation of keys or specific regions of the touch sensitive display 11 in a predetermined sequence or the inputting of a specific code such as a pin number.

The unlock input may be made on the first portion 31 of the touch sensitive display 11 which is operable when the touch sensitive display 11 is in the second state. In some embodiments of the invention the unlock input may also be made on the second portion 33 of the touch sensitive display 11 which is operable to receive unlock inputs in the second state.

In response to the detection 53 of the unlock user input the processor 3 enables the touch sensitive display 11 to exit the second state and enables a state in which the second portion 33 is operable to enable access to a set of functions. The state may be the first state in which the first portion 31 is operable to enable access to the first set of functions and the second portion 33 is operable to enable access to the second set of functions, or it may be a different state in which the first portion 31 is operable to enable access to a different set of functions than the first set of functions and/or the second portion 33 is operable to enable access to a different set of functions than the second set of functions.

Figure 5A:
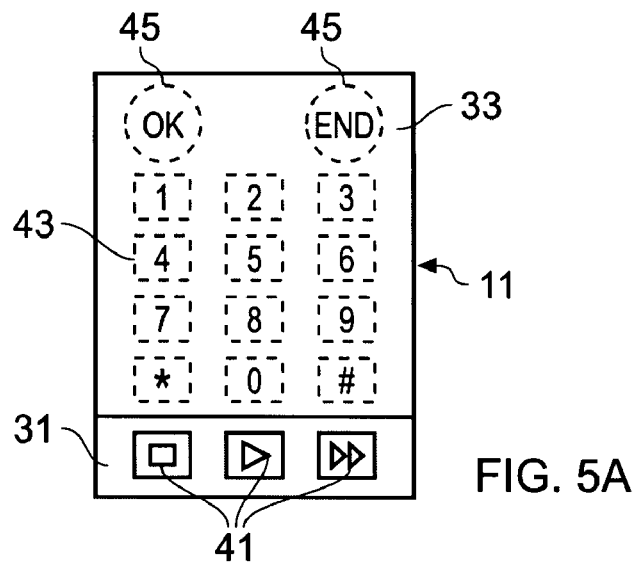
FIGS. 5A to 5C illustrate an embodiment of the present invention in use.
Figure 5B:
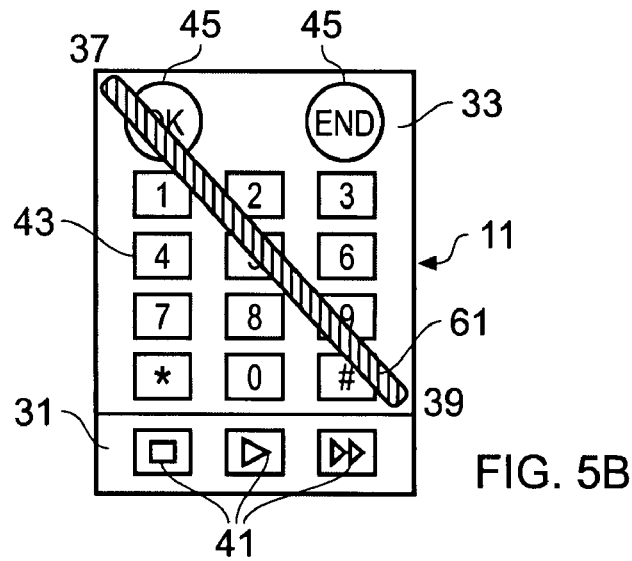
Figure 5C:
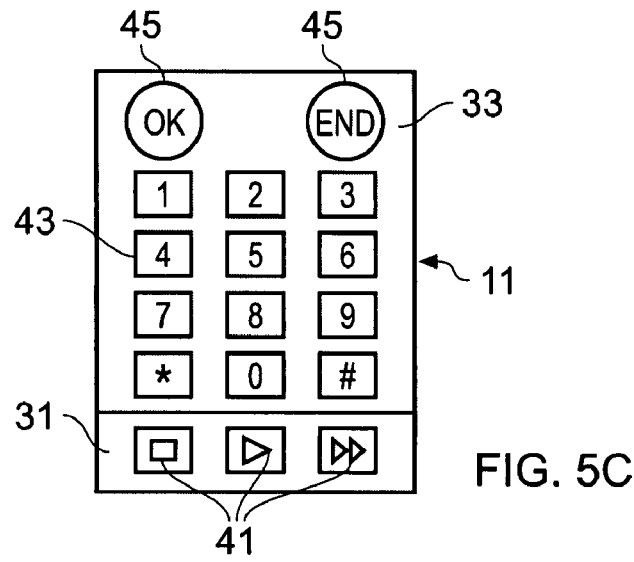

FIGS. 5A to 5C illustrate a graphical user interface according to an embodiment of the invention. In FIG. 5A the touch sensitive display 11 is enabled in the second state. The first portion 31 which enables access to functions of the music player is configured to enable access to the functions of the music player but the second portion 33 is not configured to enable access to the communications functions. The keypad 41 and user inputs 45 of the second portion 33 are indicated with dashed lines to indicate that the second portion 33 is locked.

In FIG. 5B the user has made an unlock input. In the illustrated embodiment the unlock input comprises a trace 61 user input extending from the lower right hand corner 39 of the second portion 33 and extending diagonally across the second portion 33 to the top left hand corner 37 of the second portion 33 in a reverse gesture of the first trace 35 user input which locked the second portion.

FIG. 5C illustrates the graphical user interface which is presented to a user in response to the detection 53 of the user input trace 61. The touch sensitive display 11 is now enabled 55 in a state in which the second portion 33 is unlocked so that it is configured to enable access to the communications functions. In FIG. 5C the keypad 43 and the user inputs 45 of the second portion 33 are presented with solid lines to indicate that the second portion 33 is now unlocked and the communications functions are accessible.

In the graphical user interface illustrated in FIG. 5C the first portion 31 is still configured to enable access to the music player functions.

Therefore the embodiment of the invention illustrated in FIGS. 5A to 5C provide a simple and intuitive way of unlocking the locked portion of the touch sensitive display 11.

In other embodiments the unlock input may require an input such as a PIN number or the recognition of a fingerprint. Such embodiments may be particularly useful where the user of the apparatus wishes to allow other users to access some functions of the apparatus 1 but prevent them accessing other functions. For example, where a first user of the apparatus 1 is allowing another user to use the music player functions but does not want them to make phone calls or access information stored in the apparatus 1.

Figure 6A:
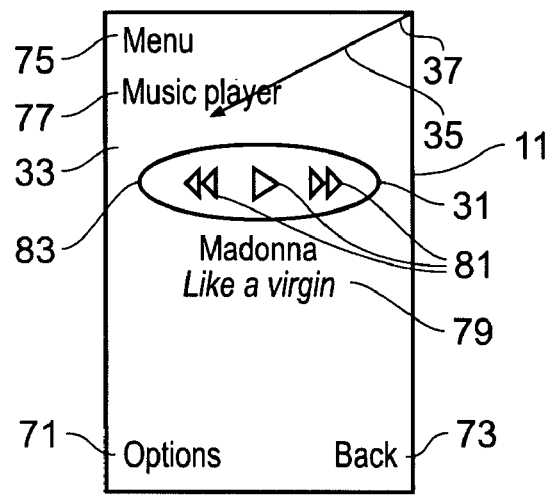
FIGS. 6A to 6C illustrate another embodiment of the present invention in use.
Figure 6B:
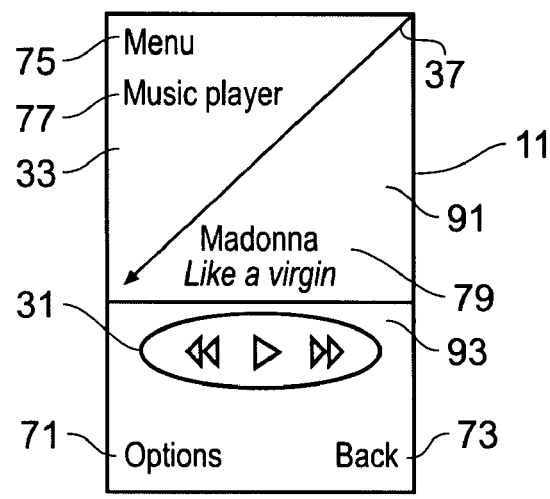
Figure 6C:
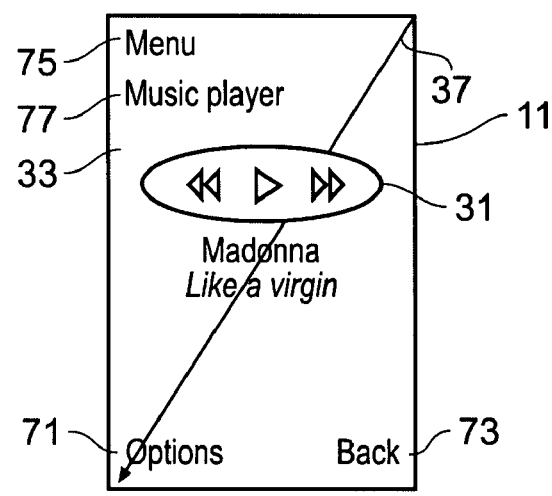

FIGS. 6A to 6C illustrate a graphical user interface according to another embodiment of the present invention.

In FIG. 6A the touch sensitive display 11 is enabled 21 in the first state in which the first portion 31 of the touch sensitive display 11 is operable to enable access to a first set of functions and the second portion 33 of the touch sensitive display 11 is operable to enable access to a second set of functions.

In the embodiment illustrated in FIG. 6A the second portion 33 of the touch sensitive display 11 comprises an icon 77 which indicates that the apparatus 1 is in a music player mode of operation and an icon 79 which indicates the song that is being played. The touch sensitive display 11 also comprises icons 71, 73 75 associated with functions of the apparatus 1 such that touching the touch sensitive display 11 in the region where the icons are displayed enables a user to access the functions of the apparatus 1. "Options" icon 71 enables a user to access options associated with the music player function, "Back" icon 73 enables a user to exit the music player function and return to a previous mode of operation of the apparatus and "Menu" icon 75 enables a user to access the menu of the apparatus 1.

In the graphical user interface illustrated in FIG. 6A the first portion 31 of the display comprises icons 81 associated with functions of the music player application which enable a user to play a music track or skip forwards or to the next or previous track. In the particular embodiment illustrated in FIG. 6A the first portion 31 is an area demarcated by a line 83. The first portion 31 is positioned on the touch sensitive display so that is surrounded by the second portion 33.

In FIG. 6A the user has started to make a user input comprising a trace 35 extending diagonally across the second portion 33 of the touch sensitive display 11, from a first position 37 in the top right hand corner of the second portion 33. In FIG. 6B the user has continued making the trace 35 input so that the trace 35 has extended over the region of the touch sensitive display 11 where the first portion 31 was located.

The processor 3 has detected that a user has begun to make an input comprising a trace 35 and in response to the detection of the trace 35 user input will configure the second portion 33 into a state in which the icons are not operable to enable access to the functions of the apparatus as the trace is being made. For example, in FIG. 6B the second portion 33 is divided into two regions. The processor 3 has detected that the trace 35 has extended over the first region and has configured the first region so that the icons 75, 77 located in the first region are not configured to enable access to the functions of the apparatus. The first region 91 is grayed out to indicate that it is not operable to enable access to functions. The trace 35 has not extended over the second region 93 and the icons 71, 73 located in the second region are still operable to enable access to the functions of the apparatus 1.

In FIG. 6B the trace 35 has extended over the region of the display where the first portion 31 was located. In response to the detection of the trace 35 extending over the region of the display where the first portion 31 was located the processor 3 will configure the touch sensitive display 11 to present the first portion 31 in a second location. The second location is within the second region 93 which is still configured to enable access to functions of the apparatus 1, this makes it clear to a user that the first portion 31 is still operable to enable access to the functions of the apparatus 1.

In FIG. 6C the user has continued making the trace 35 so that it now extends from the top right hand corner of the touch sensitive display 11 to the bottom left hand corner of the touch sensitive display 11. The processor 3 has detected that the trace 35 has now extended over all of the second portion 33 and has configured all of the second portion 33 so that none of the second portion 33 is configured to enable access to the functions of the apparatus 1. the second portion 33 is grayed out to indicate that it is not operable to enable access to functions.

The first portion 31 is still operable to enable access to the music player functions and is not grayed out. As the entire of the second portion 33 is not operable to enable access to the functions of the apparatus 1 the first portion 31 is located in the first location as illustrated in FIG. 6A. The processor 3 may be operable to display the first portion in any position on the touch sensitive display 11.

The blocks illustrated in the FIGS. 2 and 4 may represent steps in a method and/or sections of code in the computer program 7. The illustration of a particular order to the blocks does not necessarily imply that there is a required or preferred order for the blocks and the order and arrangement of the blocks may be varied.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   a processor connected with a memory that stores computer program instructions; and
   a touch sensitive display comprising a first portion and a second portion;
   the processor configured with the memory to execute the computer program instructions to detect user inputs on the touch sensitive display and control the touch sensitive display, the processor controlling the touch sensitive display in part by displaying in the first portion indications corresponding to individual functions of a first set of user-selectable functions and displaying in the second portion indications corresponding to individual functions of a second set of user-selectable functions, wherein
   the processor is configured to control the touch sensitive display, to enable a first state, in which the first portion of the touch sensitive display is operable to enable access to the first set of user selectable functions and the second portion of the touch sensitive display is operable to enable access to the second set of user-selectable functions, and to enable, in response to the detection of a first user input when the touch sensitive display is in the first state, a second state in which a sub-portion of the second portion of the touch sensitive display is not operable to enable access to any one of the second set of user-selectable functions located within the sub-portion and the first portion is operable to enable access to the first set of user-selectable functions, where the processor is further configured, when enabling the second state of the touch sensitive display, to continue to display in the second portion of the touch sensitive display the indications corresponding to the individual functions of the second set of user-selectable functions, where the indications corresponding to the individual functions of the second set of user-selectable functions that are located within the sub-portion are displayed in a predetermined manner that informs a user that the individual functions of the second set of user-selectable functions that are located within the sub-portion are locked from use by the user, wherein the first user input comprises a trace from a first position on the touch sensitive display to a second position on the touch sensitive display and a size of the sub-portion is based on the first position and the second position.

2. An apparatus as claimed in claim 1 wherein when the touch sensitive display is in the second state the processor is configured to control the touch sensitive display, in response to a second user input, to enter a state in which the second portion of the touch sensitive display is operable to enable access to the second set of user-selectable functions.

3. An apparatus as claimed in claim 2 wherein the trace of the first user input from a first position on the touch sensitive display to a second position on the touch sensitive display is in a first direction and the second user input comprises a trace in a second direction different to the first direction.

4. An apparatus as claimed in claim 2 wherein the second user input comprises one of a fingerprint input or a pin number.

5. An apparatus as claimed in claim 1 where the individual functions of the second set of user-selectable functions are displayed in the predetermined manner by dimming a backlight of the second portion of the touch sensitive display.

6. An apparatus as claimed in claim 1 wherein when the touch sensitive display is in the second state the second portion is operable to enable a user to make a second user input.

7. An apparatus as claimed in claim 1 wherein when the touch sensitive display is in the second state the second portion is not operable to enable any user inputs.

8. An apparatus as claimed in claim 1 wherein if the size of the sub-portion of the second portion is such that user-selectable functions of the first set of user selectable functions are located within the sub-portion, said processor automatically re-locates the user-selectable functions of the first set of user selectable functions so as to be located outside of the sub-portion.

9. A method comprising:
enabling a touch sensitive display in a first state in which a first portion of the touch sensitive display is operable to enable access to a first set of user-selectable functions and a second portion of the touch sensitive display is operable to enable access to a second set of user selectable functions, where enabling the touch sensitive display comprises controlling the touch sensitive display in part by displaying in the first portion indications corresponding to individual functions of the first set of user-selectable functions and displaying in the second portion indications corresponding to individual functions of the second set of user-selectable functions;

detecting a first user input;

enabling the touch sensitive display, in response to the detection of the first user input, in a second state in which in a sub-portion of the second portion of the touch sensitive display is not operable to enable access to any one of the second set of user-selectable functions located within the sub-portion and the first portion is operable to enable access to the first set of user-selectable functions, where enabling the touch sensitive display in the second state comprises continuing to display in the second portion of the touch sensitive display the indications corresponding to the individual functions of the second set of user-selectable functions, where the indications corresponding to the individual functions of the second set of user-selectable functions that are located within the sub-portion are displayed in a predetermined manner that informs a user that the individual functions of the second set of user-selectable functions that are located within the sub-portion are locked from use by the user, wherein the first user input comprises a trace from a first position on the touch sensitive display to a second position on the touch sensitive display and a size of the sub-portion is based on the first position and the second position.

10. A method as claimed in claim 9 wherein when the touch sensitive display is in the second state further comprising controlling, in response to a second user input, the touch sensitive display to enter a state in which the second portion of the touch sensitive display is operable to enable access to the second set of user-selectable functions.

11. A method as claimed in claim 9 wherein the trace of the user input from a first position on the touch sensitive display to a second position on the touch sensitive display is in a first direction and a second user input comprises a trace in a second direction different to the first direction.

12. A method as claimed in claim 10 wherein the second user input comprises one of a fingerprint input or a pin number.

13. A method as claimed in claim 9 where the individual functions of the second set of user-selectable functions are displayed in the predetermined manner by dimming a backlight of the second portion of the touch sensitive display.

14. A method as claimed in claim 9 wherein when the touch sensitive display is in the second state the second portion is operable to enable a user to make a second user input.

15. A method as claimed in claim 9 wherein when the touch sensitive display is in the second state the second portion is not operable to enable any user inputs.

16. A method as claimed in claim 9 wherein if the size of the sub-portion of the second portion is such that user-selectable functions of the first set of user selectable functions are located within the sub-portion, said processor automatically re-locates the user-selectable functions of the first set of user selectable functions so as to be located outside of the sub-portion.

17. A non-transitory computer readable medium that stores a computer program comprising program instructions for controlling an apparatus, the apparatus comprising, a touch sensitive display comprising a first portion and a second portion, the program instructions providing, when loaded into a processor:

first instructions to operate a touch sensitive display in a first state in which the first portion of the touch sensitive display is operable to enable access to a first set of user-selectable functions and the second portion of the touch sensitive display is operable to enable access to a second set of user-selectable functions, where operating the touch sensitive display in the first state comprises controlling the touch sensitive display in part by displaying in the first portion indications corresponding to individual functions of the first set of user-selectable functions and displaying in the second portion indications corresponding to individual functions of the second set of user-selectable functions;

second instructions to detect a first user input; and third instructions to operate the touch sensitive display, in response to the detection of the first user input, in a second state in which a sub-portion of the second portion of the touch sensitive display is not operable to enable access to any one of the second set of user-selectable functions located within the sub-portion and the first portion is operable to enable access to the first set of user-selectable functions, where operating the touch sensitive display in the second state comprises continuing to display in the second portion of the touch sensitive display the indications corresponding to the individual functions of the second set of user-selectable functions, where the indications corresponding to the individual functions of the second set of user-selectable functions that are located within the sub-portion are displayed in a predetermined manner that informs a user that the individual functions of the second set of user-selectable functions that are located within the sub-portion are locked from use by the user, wherein the first user input comprises a trace from a first position on the touch sensitive display to a second position on the touch sensitive display and a size of the sub-portion is based on the first position and the second position.

18. A method as claimed in claim 9, where the steps of the method are performed in response to execution of computer program instructions by a data processor, where the computer program instructions are stored in a non-transitory storage medium that is readable by the data processor, and where the data processor and the non-transitory storage medium comprise a part of an electronic apparatus that also comprises the touch sensitive display.

19. A user interface comprising:

a touch sensitive display comprising a first portion and a second portion, the touch sensitive display having a first state, in which the first portion of the touch sensitive display is operable to enable access to a first set of user-selectable functions and the second portion of the touch sensitive display is operable to enable access to a second set of user-selectable functions, and a second state in which a sub-portion of the second portion of the touch sensitive display is not operable to enable access to any one of the second set of user-selectable functions located within the sub-portion and the first portion is operable to enable access to the first set of user-selectable functions, where when in the first state the touch sensitive display displays in the first portion indications corresponding to individual functions of the first set of user-selectable functions and displays in the second portion indications corresponding to individual functions of the second set of user-selectable functions;

wherein when the touch sensitive display is in the first state the touch sensitive display is operable to receive a first user input such that in response to the detection of the first user input the touch sensitive display enters the second state, where when in the second state the touch sensitive display continues to display in the second portion of the touch sensitive display the indications corresponding to the individual functions of the second set of user-selectable functions, where the indications corresponding to the individual functions of the second set of user-selectable functions that are located within the sub-portion are displayed in a predetermined manner that informs a user that the individual functions of the second set of user-selectable functions that are located within the sub-portion are locked from use by the user, where the first user input comprises a trace from a first position on the touch sensitive display to a second position on the touch sensitive display and a size of the sub-portion is based on the first position and the second position.

* * * * *